United States Patent [19]
Fujiu et al.

[11] Patent Number: 5,137,672
[45] Date of Patent: Aug. 11, 1992

[54] METHOD FOR PRODUCING HOSE HAVING LOW PERMEABILITY

[75] Inventors: Katsuyoshi Fujiu; Eiji Koyasu; Hisatoshi Tsuchida, all of Ootawara, Japan

[73] Assignee: Sakura Rubber Co., Ltd., Tokyo, Japan

[21] Appl. No.: 660,565

[22] Filed: Feb. 25, 1991

[30] Foreign Application Priority Data

Mar. 14, 1990 [JP] Japan .................................. 2-61209

[51] Int. Cl.$^5$ ........................ B29C 33/64; B29C 47/00
[52] U.S. Cl. .................................. 264/130; 264/166; 264/236
[58] Field of Search ................ 264/83, 103, 130, 166, 264/173, 236, 347

[56] References Cited

U.S. PATENT DOCUMENTS 3,972,757  8/1976  Derderian et al. ............. 264/347 X
4,950,436  3/1990  Kitami et al. ....................... 264/103

FOREIGN PATENT DOCUMENTS 53-129877  11/1978  Japan ................................. 264/130
63-45302   9/1988   Japan .
1-271229   10/1989  Japan .

*Primary Examiner*—Leo B. Tentoni
*Attorney, Agent, or Firm*—Ladas & Parry

[57] ABSTRACT

A method of producing a hose having low permeability includes the steps of preparing a rubber mandrel having an outer releasing layer made of fluoride rubber, applying a silicon-based releasing agent having a viscosity of 300–1000 cs to the releasing layer in a state where the mandrel is being moved, and extruding a molten resin and coating it onto the releasing agent-applied mandrel while the mandrel is being moved, thereby forming a resin layer. By virtue of the provision of the releasing layer and also the application of the releasing agent to the releasing layer, the releasability of the mandrel is enhanced, thereby preventing the resin layer of the resultant hose from being injured when the mandrel removed therefrom. Hence, if the hose is used for transferring a refrigerant gas such as freon refrigerant, it is free from gas leakage, and shows high durability.

7 Claims, 8 Drawing Sheets

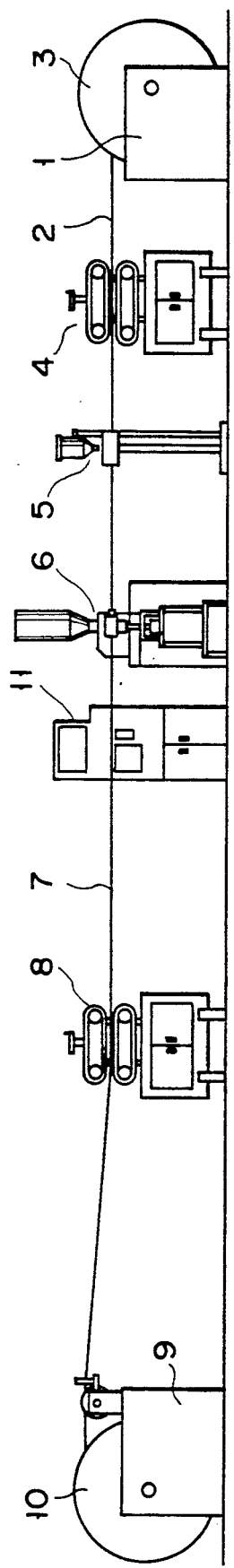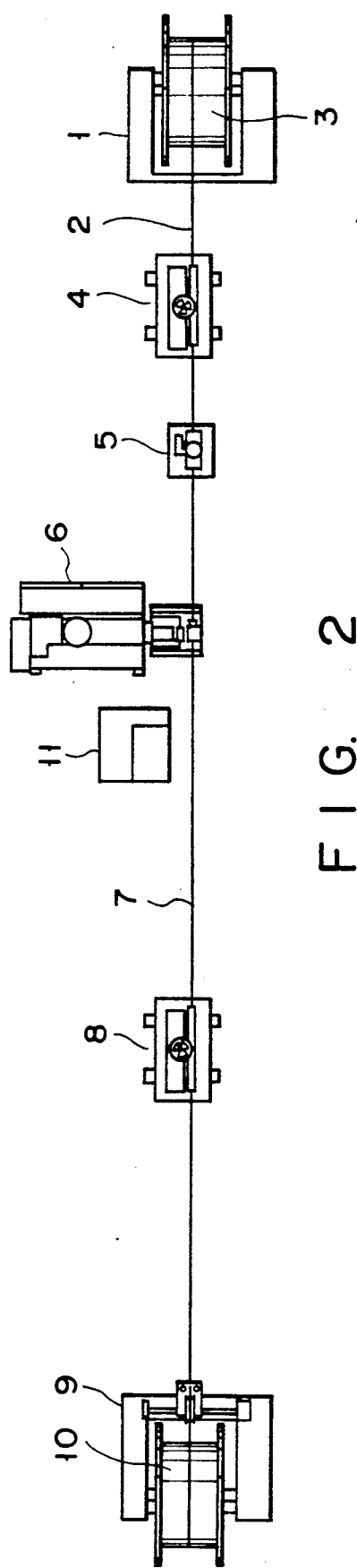

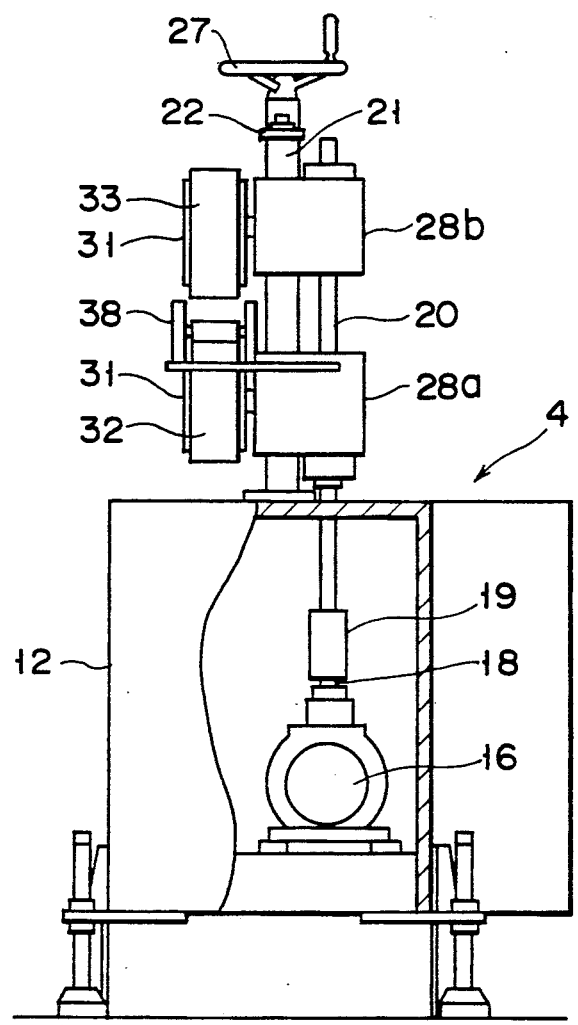
F I G. 5
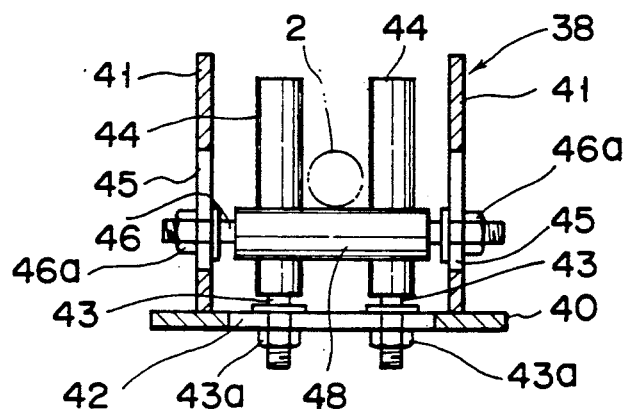
F I G. 6

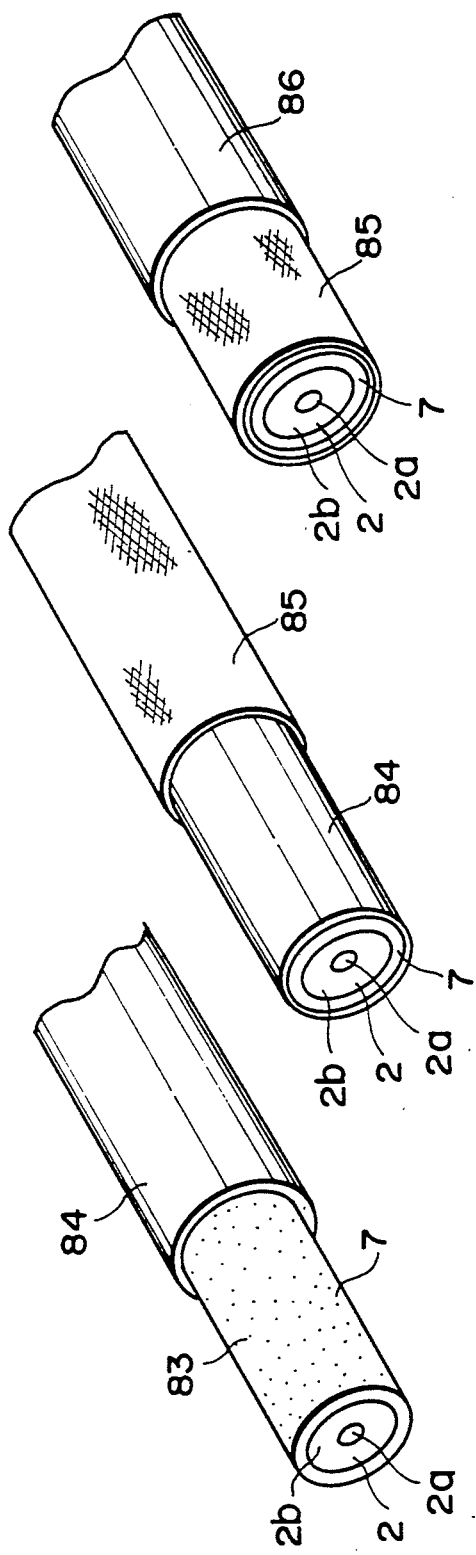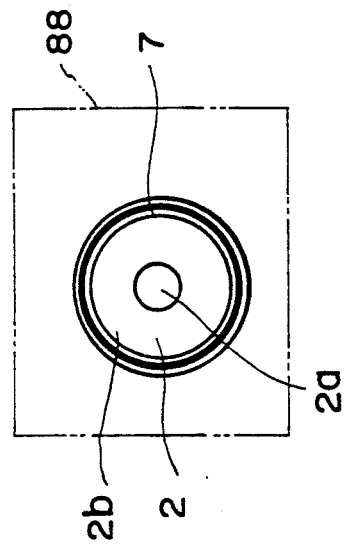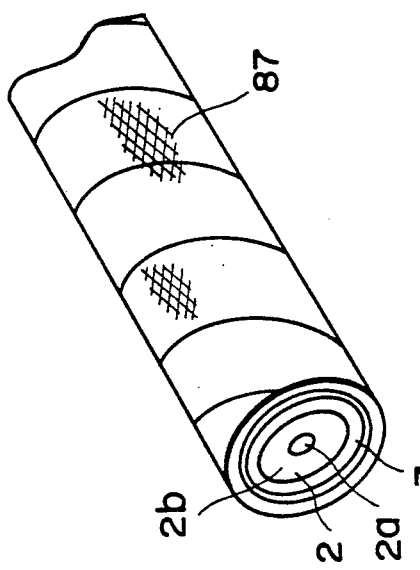

METHOD FOR PRODUCING HOSE HAVING LOW PERMEABILITY

BACKGROUND OF THE INVENTION

1. Field of the Invention

This invention relates to a method for producing a hose having low permeability.

2. Description of the Related Art

In an air conditioner such as one for use in an automobile, a compressor, a condensor and an evaporator are interconnected by hoses through which a refrigerant such as FREON refrigerant circulates. To circulate such a refrigerant at high temperature and under high pressure, the hoses must be formed of a material having high durability, anticorrosion, and heat resistance, and also low permeability to prevent the refrigerant from permeating them.

Methods for producing a hose for transferring a refrigerant are disclosed in, for example, Published Examined Japanese Patent Application No. 63-45302 and Published Unexamined Japanese Patent Application No. 1-271229.

In the method disclosed in Published Examined Japanese Patent Application No. 63-45302, molten resin is, at first, extruded from an extruder, and then coated onto the outer surface of a mandrel heated above 40° C. but below the melting point of the resin. The molten resin is then cooled down, thereby forming an inner pipe. A reinforcing layer, a rubber layer as an outer pipe, and the like are coated on the outer surface of the inner resin pipe. The inner resin pipe, reinforcing layer, and outer rubber pipe are cured to prevent the inner resin pip from being cooled abruptly and hence to restrain the deformation of the outer surface of the inner pipe.

The method disclosed in Published Unexamined Japanese Patent Application No. 1-271229 is similar to the above-described method. This method employs a mandrel made of rubber or resin whose plasticizer content is within a range of 0 to 10% by weight, and whose bending force is within a range of 0.2 to 3 kgf. A releasing agent is applied to the mandrel, and then the mandrel is dried and coated with molten resin. Thereafter, the mandrel is removed from the resultant hose such that the hose does not have flaws in its inner surface, so as to prevent gas leakage.

The above method comprises the steps of:

i) extruding molten resin from a resin extruder onto a mandrel, thereby forming a resin layer;

ii) applying an adhesive to the resin layer, thereby forming an adhesive layer;

iii) extruding rubber from a rubber extruder and coating it onto the adhesive layer, thus forming an inner rubber layer;

iv) braiding the outer peripheral surface of the inner layer, thereby forming a reinforcing layer;

v) extruding rubber from the rubber extruder and coating it onto the reinforcing layer, thus forming an outer rubber layer;

vi) wrapping the outer peripheral surface of the outer layer with a tape;

vii) curing the resultant structure;

viii) removing the tape wrapped; and ix) removing the mandrel by applying pressurized water between the mandrel and resin layer.

In this method, however, the resin layer is likely to stick to the outer surface of the mandrel too firmly to remove the mandrel in the last step, thereby making flaws in the inner surface of the resin layer when the mandrel is removed, which may cause leakage of refrigerant.

Further, if highly-pressurized water is applied between the mandrel and resin layer to facilitate the removal of the mandrel, it causes the resin layer to expand locally and thus to have some thin portions through which refrigerant may leak.

SUMMARY OF THE INVENTION

It is the object of the invention to provide a method for forming a resin layer on a mandrel such that the layer can be easily removed from the mandrel by applying low-pressurized water between itself and the mandrel, thereby producing a hose of low permeability which has an inner resin layer almost free from flaws.

The method of the invention comprises a first step of preparing a rubber mandrel having a parting or releasing layer as the outermost layer, and applying a silicone-based parting or releasing agent having a viscosity of 300–1000 cs to the releasing layer of the mandrel, a second step of extruding molten resin and applying it to the mandrel coated with the releasing agent, thus forming a resin layer, a third step of forming on the resin layer an inner rubber layer, a reinforcing layer, and an outer rubber layer in the order mentioned, and a fourth step of curing or thionating the inner and outer layers.

According to the invention, the mandrel has high releasability by virtue of the releasing layer of the mandrel and the silicone-based releasing agent coated on the releasing layer and having a viscosity of 300–1000 cs. Thus, the polyamide-series resin layer serving as barrier is not easily injured when the mandrel is removed from the layer.

However, if a large amount of releasing agent is used in a case where a rewinding drum of a small diameter is employed (since it is actually convenient to use the small-diameter drum in the method), the resin barrier layer will easily come off the mandrel in a rewinding process subsequent to the resin layer-forming process, thereby causing wrinkles on the resin layer. These wrinkles become hard on the inner surface of the resultant structure (i.e. hose) during curing carried out in a later process. To avoid the disadvantage, the present invention employs a mandrel having an outermost layer made of fluoro rubber, thus greatly reducing the required amount of the releasing agent. By virtue of this structure, the mandrel has high releasability, and also the resultant hose is free from wrinkles.

Further, in the present invention, the releasing agent is applied to the mandrel while the mandrel is linearly moved from a delivery drum by a forwarding device.

Moreover, the molten resin is extruded and coated onto the mandrel while the mandrel is moved at a constant speed by a receiver.

The mandrel comprises a core member of twisted metal wire and a rubber layer of EPDM (ethylene-propylene-diene terpolymer) deposited on the outer circumference of the core member. The parting layer is fluoro rubber, and the molten resin is a polyamide-series modified resin.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic side view, showing the entire arrangement of a hose producing apparatus according to an embodiment of the invention;

FIG. 2 is a schematic plan view of the apparatus shown in FIG. 1;

FIG. 5 is a partially cutaway front view of the forwarding device;

FIG. 6 is a longitudinal sectional view of a guide mechanism shown in FIG. 1;

FIGS. 11A to 11E are views, useful in explaining the hose-producing sequence according to the invention.

DETAILED DESCRIPTION OF THE PREFERRED EMBODIMENTS

Figure 3:
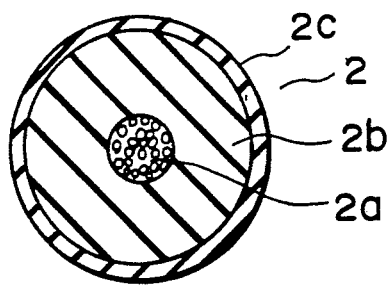
FIG. 3 is a cross-sectional view of a mandrel shown in FIG. 1.

The invention will be explained in detail with reference to the accompanying drawings showing an embodiment thereof.

FIGS. 1 and 2 schematically show the entire arrangement of a hose-producing apparatus. A delivery device 1 supports a delivery drum 3 such that the drum can rotate. The drum 3 has a flexible mandrel 2 wound therearound and consisting of a core 2a comprising wires or the like, a rubber layer 2b of an ethylene propylene diene terpolymer (EPDM) covering the core, and a releasing layer 2c formed of fluoro rubber, covering the rubber layer.

A forwarding device 4 is provided downstream of the delivery device 1 with respect to the direction in which the mandrel 2 is fed. The device 4 forwards at a predetermined speed the mandrel 2 wound around the drum 3, with the mandrel held between rollers, hereinafter referred to.

A releasing-agent applying device 5 is provided downstream of the forwarding device 4, for applying a silicone-based releasing agent to the mandrel.

A resin extruder 6 having a T-shaped die is arranged downstream of the releasing device 5, for extruding molten resin onto the mandrel 2 to form a resin layer 7.

A receiver 8 is provided downstream of the extruder 6. The receiver receives at a predetermined speed the mandrel 2, coated with the resin layer 7, by holding the opposite side ends of the mandrel.

A rewinder 9 is provided downstream of the receiver 8, and supports a rewinding drum 10 such that the drum can rotate and rewind the mandrel 2 coated with the resin layer.

Thus, the delivery device 1, forwarding device 4, releasing-agent applying device 5, resin extruder 6, receiver 8, and rewinder 9 are arranged in a line at predetermined intervals. These devices operate in order that the mandrel 2 is fed with a predetermined tension kept. An operating table 11 is located in the vicinity of the process line, for controlling the devices.

Figure 4:
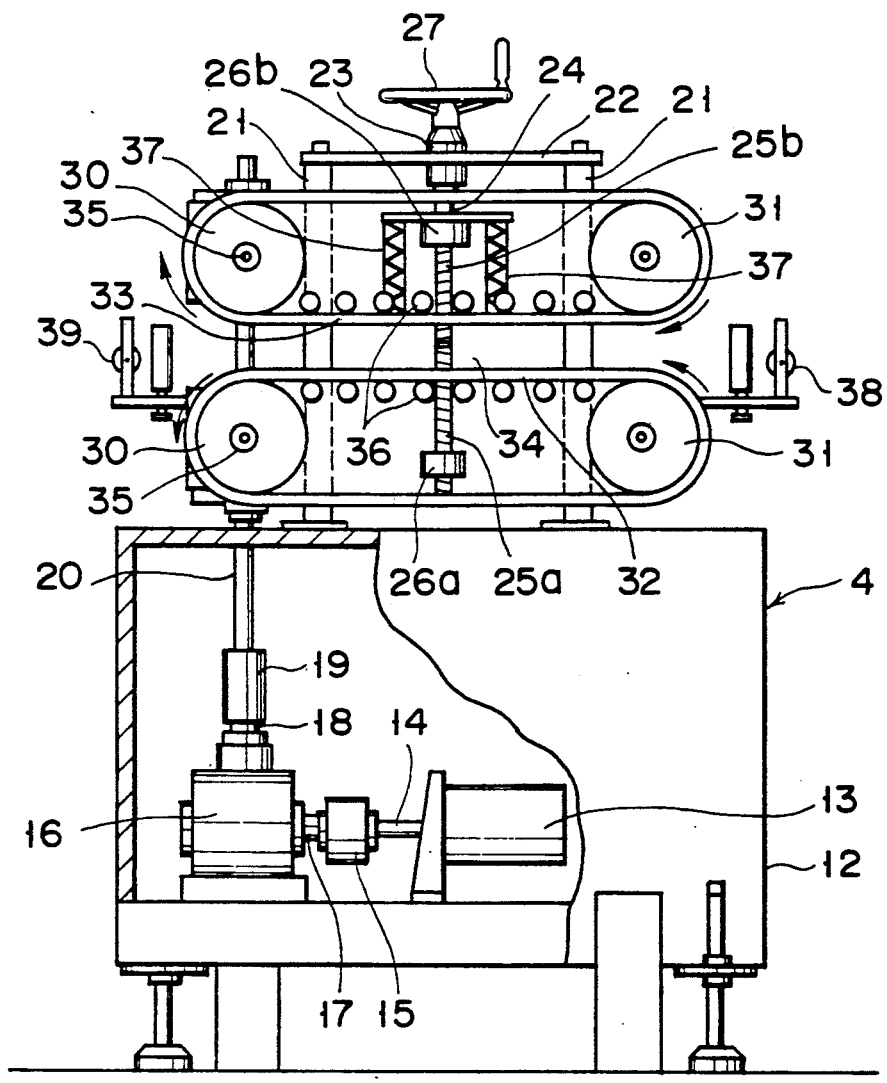
FIG. 4 is a partially cutaway side view of a forwarding device shown in FIG. 1.

FIGS. 4 to 6 show the forwarding device 4. A motor 13 as a driving source is secured in a base table 12, and has a rotary shaft 14 connected to an input shaft 17 of a decelerator 16 via a joint 15. The decelerator 16 has an output shaft 18 projecting in the vertical direction and connected to a driving shaft 20 via a joint 19.

Two guide posts 21 are provided on the base table 12, with an interval therebetween. A support plate 22 bridges the posts 21, and has a bearing 23 extending therethrough and passing its center. The bearing 23 supports a screw rod 24 extending in the vertical direction such that the rod can rotate. The screw rod 24 has, for example, a lower portion consisting of a right-handed screw 25a, and an upper portion consisting of a left-handed screw 25b. The right-handed screw 25a is screwed in a lower nut 26a, while the left-handed screw 25b is screwed in an upper nut 26b. An operating handle 27 is provided on the upper end of the screw rod 24.

The guide posts 21 support a lower belt supporter 28a and an upper belt supporter 28b such that the supporters can move in the vertical direction. Thus, the lower and upper nut 26a and 26b cannot rotate, but can move in the vertical direction.

A driving pulley 30 is secured to an end of each of the lower and upper belt supporters 28a and 28b, and a driven pulley 31 is secured to the other end of each of them. A lower belt 32 is provided for the driving and driven pulleys 30 and 31 of the lower belt supporter 28a, while an upper belt 33 is provided for the driving and driven pulleys 30 and 31 of the upper belt supporter 28b. Thus, the lower and upper belts 32 and 33 are arranged in parallel with each other, with a space 34 interposed therebetween.

The driving and driven pulleys 30 have respective rotary shafts 35 connected to the driving shaft 20 via a gear mechanism (not shown), and hence the pulleys rotate in directions opposite to each other, i.e., in the directions indicated by the arrows, respectively.

The lower and upper belts 32 and 33 are guided by guide rollers 36 arranged such that they contact the inner surfaces of the belts. The upper belt 33 is urged downward by springs 37.

Guide mechanisms 38 and 39 are provided on the inlet and outlet sides at locations opposed to the space 34, and have the same structure. Specifically, each mechanism is constructed as follows: Two vertical plates 41 are provided on the upper surface of a horizontal plate 40. A long hole 42 is formed in the plate 40, extending widthwise. Support shafts 43 vertically extend through the hole 42 and secured to the plate 40 by nuts 43a. Guide rollers 44 are rotatably provided around the shafts 43. The vertical plates 41 have long holes 45 extending lengthwise. A support shaft 46 extends through the holes 45, and is secured horizontally to the plates 41 by nuts 46a. A guide roller 48 is rotatably provided around the shaft 46.

Thus, the mandrel 2 is guided by three guide rollers, i.e., the vertical guide rollers 44 and horizontal guide roller 48. The support shafts 43 and 46 can be moved in the long holes 42 and 45 by loosening the nuts 43a and 46a, to thereby adjust the distance between the rollers 44 and/or the height of the roller 48.

Figure 7:
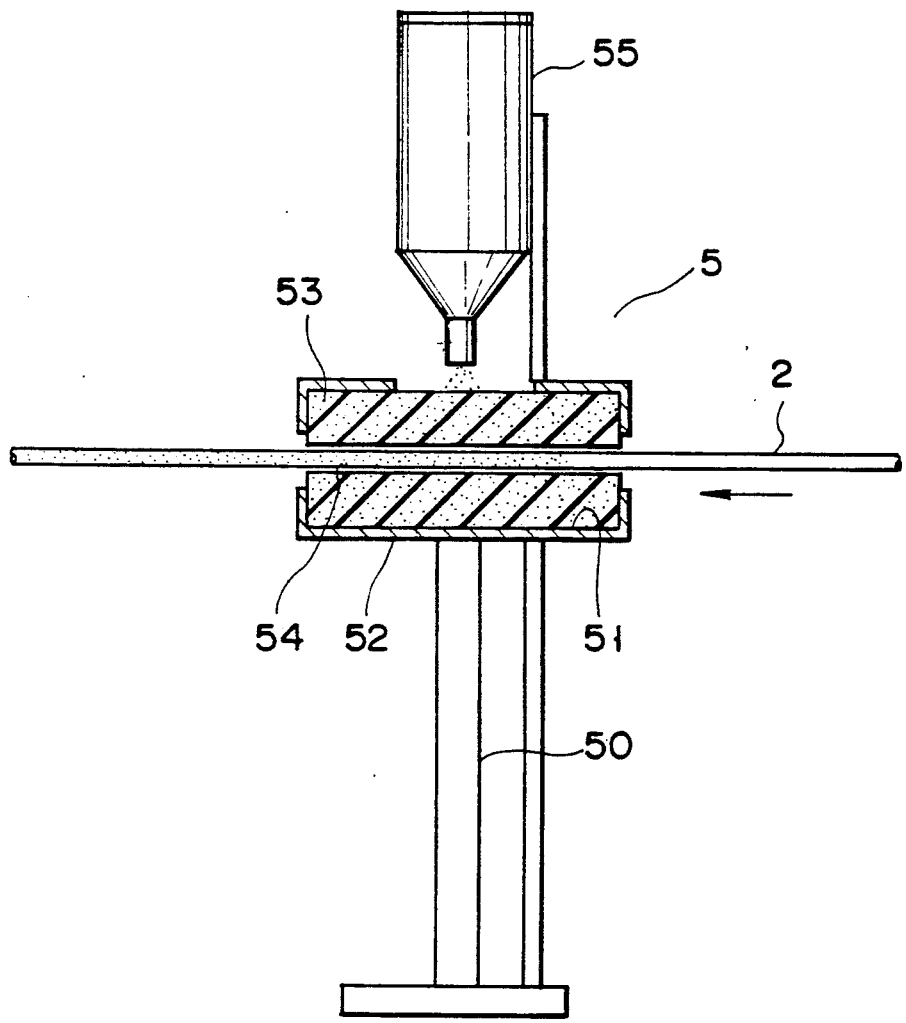
FIG. 7 is a longitudinal sectional view of a releasing-agent applying device shown in FIG. 1.

FIG. 7 shows the releasing-agent applying device 5. A casing 52 having a cavity 51 through which the mandrel 2 is to move is provided on the upper end of a support pole 50. The cavity 51 is filled with a cushion member 53 which is impregnated with a silicone-based releasing agent. The member 53 has a insertion through hole 54 formed therein in which the mandrel 2 is inserted. A hopper 55 is arranged above the casing 52, for supplementing the releasing agent into the cushion member 53. Thus, the releasing agent is uniformly applied to the peripheral surface of the mandrel 2 while the mandrel moves through the insertion hole 54.

Figure 8:
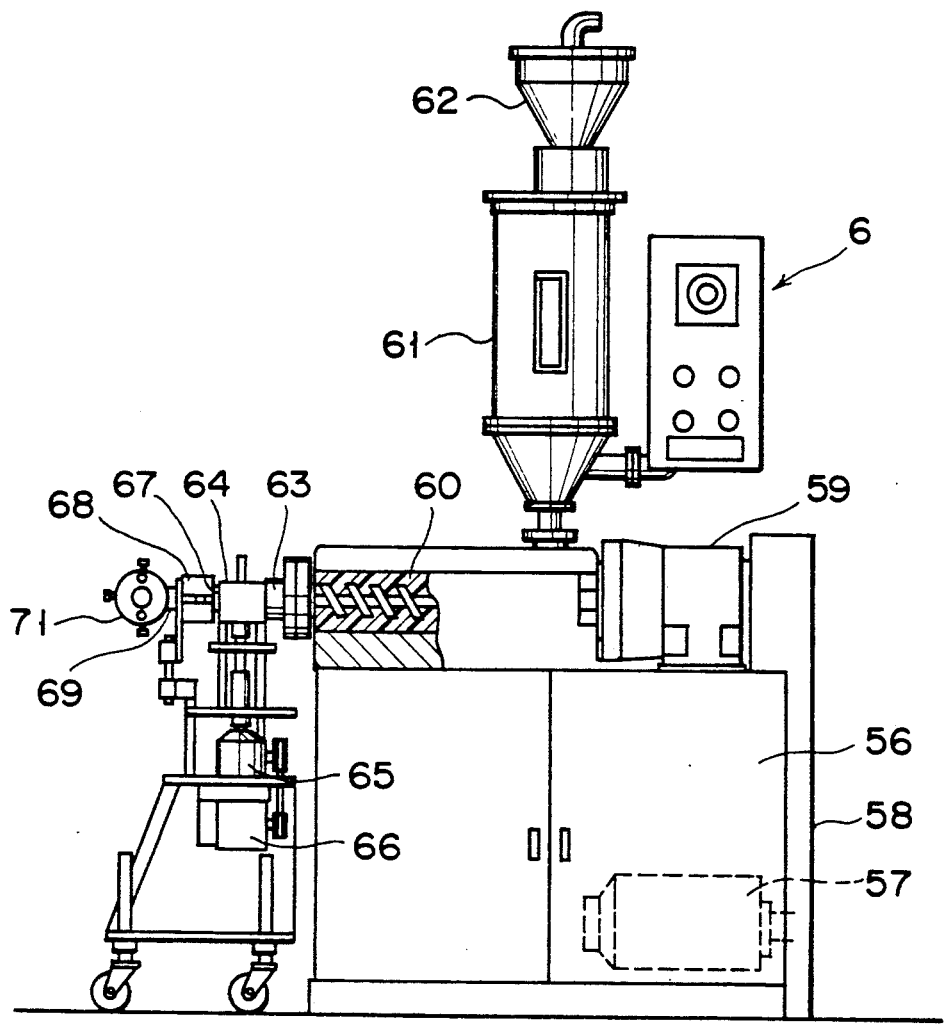
FIG. 8 is a partially cutaway side view of an extruder shown in FIG. 1.
Figure 9:
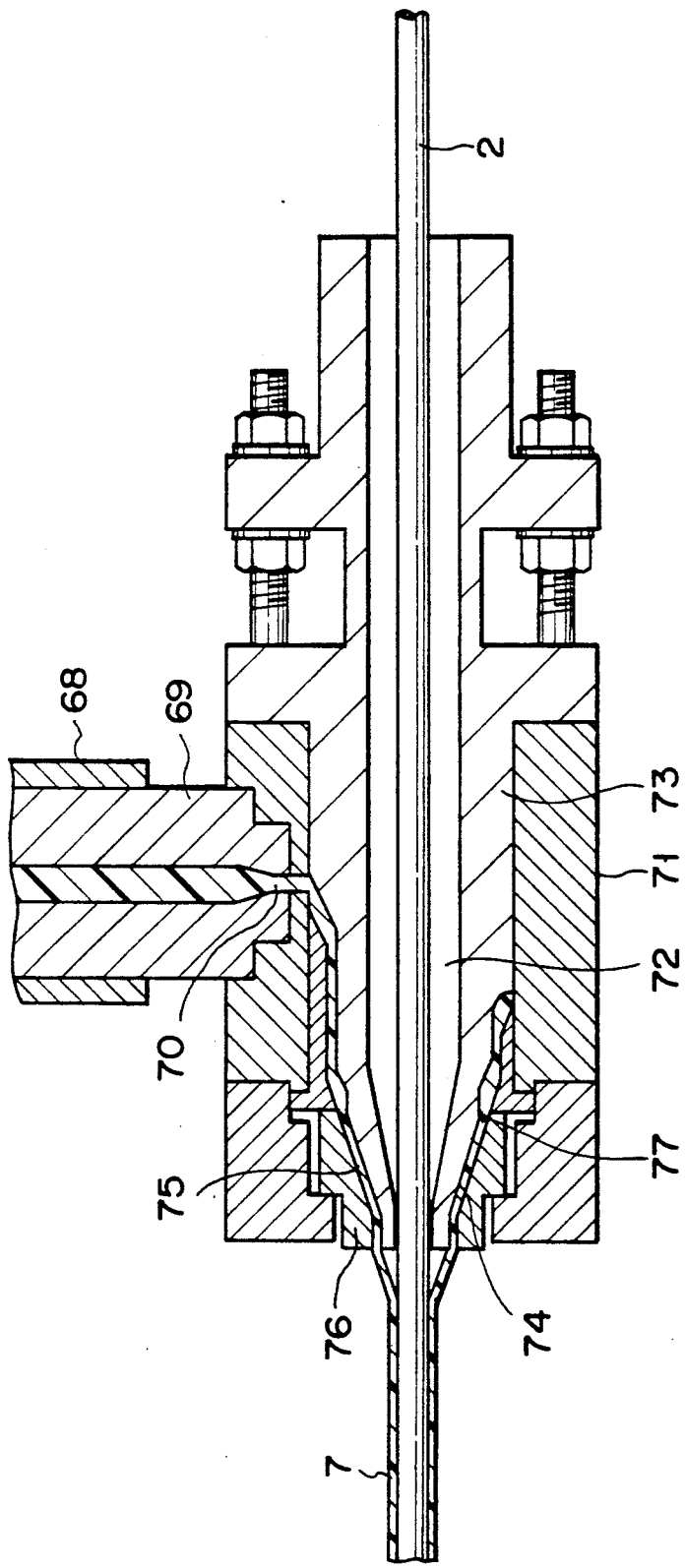
FIG. 9 is a longitudinal sectional view of a cross head shown in FIG. 1.

FIGS. 8 and 9 show the resin extruder 6. A motor 57 is housed in a base table 56, and connected, via a power-transfer mechanism 58 such as a belt or chain, to a decelerator 59 provided on the upper surface of the table 56. The decelerator 59 drives a resin-extruding cylinder 60 to heat and melt resin and to extrude the resultant molten resin while knealing it. A hopper dryer 61 is provided on the upper end of the cylinder 60. A hopper loader 62 is provided on the upper end of the dryer 61. Resin chips are supplied to the hopper loader 62, then dried by the hopper dryer 61, and thereafter supplied into the cylinder 60.

The cylinder 60 has a resin-discharge port 63 to which a gear pump 64 is connected for controlling the resin discharge amount. The pump 64 is connected to a motor 66 via a decelerator 65, and driven by the motor. The pump 64 has a discharge port 67 connected to a hot runner 69 provided with a heater 68. The hot runner 69 has a discharge port 70 provided with a cross head 71.

A nipple 73 having an insertion through hole 72, through which the mandrel 2 is to be inserted, is provided in the cross head 71. The nipple 73 has a conical or tapered portion 74 formed at the downstream end thereof. A die 76 having a groove 75 is mounted on the tapered portion 74, thus forming a resin passage 77 communicated with the hot runner 69.

Thus, the mandrel 2 is coated with molten resin passing through the resin passage 77 when it is discharged from the nipple 73.

Explanation of the receiver 8 is omitted since the receiver has the same structure as the forwarding device 4.

Figure 10:
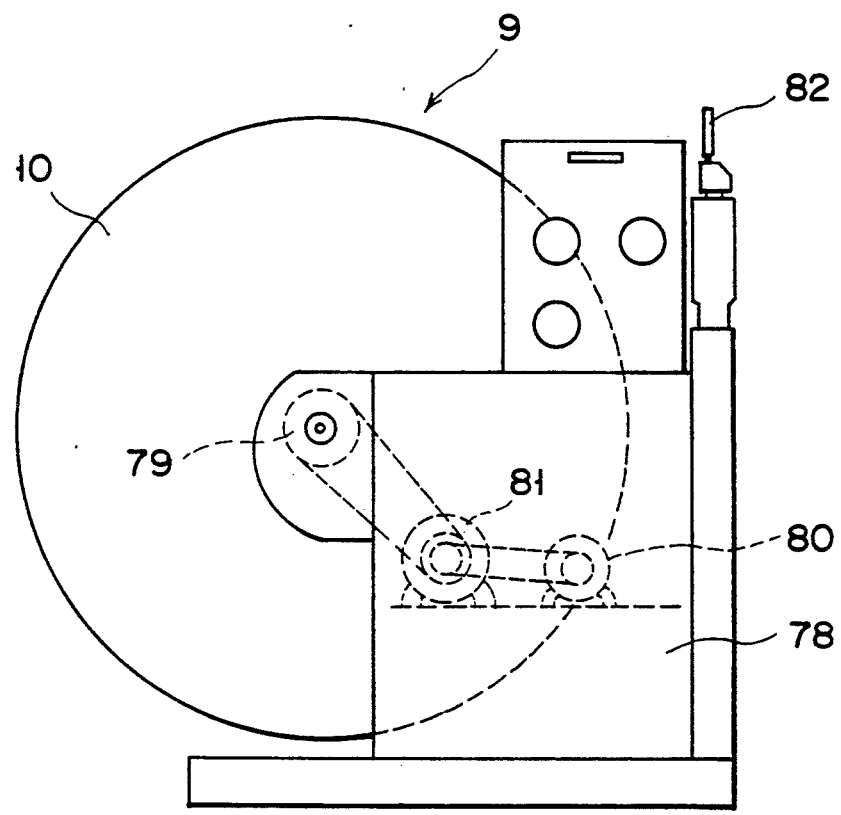
FIG. 10 is a side view of a rewinder shown in FIG. 1.

FIG. 10 shows the rewinder 9. A support frame 78 supports a rotary shaft 79 for the rewinding drum 10. The frame 78 contains a motor 80 and a decelerator 81, and the shaft 79 is driven by the motor 80 via the decelerator 81. The frame 78 has a guide member 82 for introducing the mandrel 2, coated with the resin layer, into the rewinding drum 10.

Now, a method of producing a hose having low permeability by the above-described apparatus will be explained.

When the motor 13 of the forwarding device 4 is turned on, its rotation is transferred to the driving shaft 20 via the decelerator 16. The rotation of the shaft 20 is then transferred to the driving pulleys 30 via the gear mechanism. Thus, the lower and upper belts 32 and 33 bridging the driving pulleys 30 and driven pulleys 31 rotate in the directions indicated by the arrows shown in FIG. 4. The mandrel 2 fed from the delivery device 1 is moved by the belts 32 and 33 through the space 34 defined by them.

The space 34 can be varied in accordance with the outer diameter of the mandrel 2. Rotating the operating handle 27 clockwise makes the screw rod 24 rotate, so that the lower belt supporter 28a moves upward together with the nut 26a screwed on the right-handed screw 25a of the screw rod 24, while the upper belt supporter 28b moves downward together with the nut 26b screwed on the left-handed screw 25b. Similarly, rotating the handle 27 counterclockwise, the lower belt supporter 28a moves downward, and the upper belt supporter 28b upward. Thus, the mandrel 2 is held between the belts 32 and 33 under a desired pressure by adjusting the space 34 in accordance with the diameter of the mandrel 2.

The mandrel 2 fed from the forwarding device 4 is then inserted into the insertion through hole 54 of the cushion member 53 impregnated with a releasing agent. Since the cushion member 53 is continuously supplied with a silicone-based releasing agent from the hopper 55, the mandrel 2 is uniformly coated with the agent during moving in the hole 54.

The silicone-based releasing agent has a viscosity falling within a range of 300–1000 cs. The mandrel 2 can be easily removed from the resultant structure (i.e. the mandrel has high releasability), by virtue of that releasing layer 2c of the mandrel 2 which is formed as the outermost layer thereof, and also the releasing agent applied to the releasing layer.

As is described before, when the mandrel 2 coated with the releasing agent passes through the resin extruder 6, it is further coated with molten resin, thereby obtaining the resin layer 7. Specifically, the motor 57 drives the resin-extruding cylinder 60 via the power-transfer mechanism 58 and decelerator 59. In the cylinder 60, resin chips supplied from the hopper dryer 63 are heated into molten resin, and the molten resin is kneaded. The kneaded molten resin is then discharged from the discharge port 63.

The molten resin discharged is adjusted by the gear pump 64 such that a predetermined amount of it is constantly supplied into the resin passage 77 via the hot runner 69. Since the mandrel 2 moves at a constant speed through the insertion through hole 72 formed in the nipple 73 of the cross head 71, it is coated with the molten resin discharged from the resin passage 77. The molten resin coated on the mandrel 2 becomes solid at the room temperature, and resin layer 7 having a thickness of 150–250 μ is formed thereon.

The mandrel 2 coated with the resin layer 7 is received in the receiver 8 having the same structure as the forwarding device 4, and then guided to the rewinder 9, where it is rewinded by the motor 80 around the rewinding drum 10 of the rewinder 9.

As described above, the application of the releasing agent to the mandrel 2 and forming of the resin layer 7 thereon are successively carried out.

The molten resin forming the resin layer 7 is a polyamide-series modified resin as follows:
 i) N6/66+(N11 or N12)
 ii) N46+(N11 or N12)+olefine
 iii) N46+olefine
 iv) a first layer: N11 or N12; a second layer: an N46 laminated layer
(N is nylon, and i)–iii) are blends and/or polymer alloys).

A hose is produced from the mandrel 2 coated with the resin layer 7 and rewinded around the drum 10, in the way shown in FIGS. 11A to 11E. As is shown in FIG. 11A, an adhesive is applied onto the outer surface of the resin layer 7, forming an adhesive layer 83, and rubber is extruded from a rubber extruder, not shown, and applied to the adhesive layer 83, forming a inner rubber layer 84. Then, as is shown in FIG. 11B, the outer surface of the inner layer 84 is braided, forming a reinforcing layer 85. Subsequently, as is shown in FIG. 11C, rubber is extruded again from the rubber extruder, and applied to the reinforcing layer 85, thereby forming an outer rubber layer 86.

Thereafter, the outer rubber layer 86 is wrapped with a cloth tape 87, as is shown in FIG. 11D. The layer wrapped is cured in a furnace 88, as is shown in FIG. 11E.

After curing, the tape is unwrapped, and the mandrel is removed from the resultant structure, as in the conventional case.

In general, the mandrel is removed by applying pressurized water between it and the resin layer 7. As is described above, in the present invention, the mandrel 2 has the outermost releasing layer 2c made of fluoro rubber, and a silicone-based releasing agent having a viscosity of 300–1000 cs is applied to the layer 2c, which enhances the releasability of the mandrel 2 and hence enables it to be removed with ease. As a result, the inner surface of the resin layer is scarcely injured when the mandrel is removed.

However, if the viscosity of the releasing agent is too high, it is possible that the resin layer 7 is separated from the mandrel, and only the layer is received in the receiver 8. In this case, the resin layer 7 may be wrinkled when it is discharged from the receiver 8. Wrinkles may cause cracks, thereby reducing the durability of the hose and also making the possibility of leakage strong.

The inventors have experimental results as follows:

| Agent Viscosity | Releasing Layer | Rewinding Diameter | Wrinkle | Releasability |
|---|---|---|---|---|
| 200 cs | present | φ 1.0 m | present | satisfactory |
| 300 cs | present | φ 1.0 m | not present | satisfactory |
| 450 cs | present | φ 1.0 m | not present | satisfactory |
| 1000 cs | present | φ 1.0 m | not present | satisfactory |
| 1000 cs | not present | φ 1.0 m | not present | satisfactory |
| 3000 cs | present | φ 1.0 m | present | not satisfactory |

As can be understood from the above table, the mandrel 2 has satisfactory releasability and the resin layer 7 has an unwrinkled inner surface, by providing the mandrel 2 with the releasing layer 2c as the outermost layer thereof, and also applying to the releasing layer 2c the silicone-based releasing agent having a viscosity falling within a range of 300–1000 cs. Thus, by using the method of the invention, the releasability of the mandrel 2 is enhanced, thereby producing a hose having a resin layer with few flaws and/or wrinkles which may cause cracks. This hose is superior in transferring refrigerants such as FREON refrigerant, since it is free from gas leakage and has enhanced durability.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of producing a hose having low permeability, comprising:
   a first step of applying a silicone-based releasing agent to an outer releasing layer of a mandrel comprising a rubber core and said outer releasing layer, said silicon-based releasing agent having a viscosity within the range of about 300–1000 cs;
   a second step of extruding a molten resin and applying it to the mandrel coated with the releasing agent, thereby forming a resin layer;
   a third step of forming on the resin layer an inner rubber layer, a reinforcing layer, and an outer-rubber layer, in the order mentioned; and
   a fourth step of curing the inner and outer rubber layers.

2. The method according to claim 1, wherein the first step is carried out in a state where the mandrel is being linearly moved by a forwarding device from a delivery drum.

3. The method according to claim 1, wherein the second step is carried out with the mandrel being moved at a constant speed by a receiver.

4. The method according to claim 1, wherein the mandrel is formed of a core member of a twisted wire and a rubber layer of ethylene-propylene-diene terpolymer deposited on an outer circumference of the core member.

5. The method according to claim 1, wherein the releasing layer is a fluoro rubber.

6. The method according to claim 1, wherein the molten resin is a polyamide-series modified resin.

7. The method according to claim 1, further comprising a fifth step of separating the hose from the mandrel coated with the releasing agent.

* * * * *